US012456317B2

(12) United States Patent
Fujimoto et al.

(10) Patent No.: US 12,456,317 B2
(45) Date of Patent: Oct. 28, 2025

(54) SYSTEMS AND METHODS FOR DETECTION AND CORRECTION OF OCR TEXT

(71) Applicant: Ancestry.com Operations Inc., Lehi, UT (US)

(72) Inventors: Masaki Stanley Fujimoto, Provo, UT (US); Yen-Yun Yu, Murray, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 570 days.

(21) Appl. No.: 17/895,818

(22) Filed: Aug. 25, 2022

(65) Prior Publication Data

US 2023/0083000 A1   Mar. 16, 2023

Related U.S. Application Data

(60) Provisional application No. 63/237,839, filed on Aug. 27, 2021.

(51) Int. Cl.
*G06V 30/12*    (2022.01)
*G06V 30/19*    (2022.01)
*G06V 30/26*    (2022.01)

(52) U.S. Cl.
CPC ...... *G06V 30/133* (2022.01); *G06V 30/19147* (2022.01); *G06V 30/26* (2022.01)

(58) Field of Classification Search
CPC . G06V 30/133; G06V 30/19147; G06V 30/26
See application file for complete search history.

(56) References Cited

U.S. PATENT DOCUMENTS

| | | | | |
|---|---|---|---|---|
| 2022/0350998 | A1* | 11/2022 | Desai | G06N 3/0442 |
| 2022/0405524 | A1* | 12/2022 | Yuan | G06N 3/0442 |
| 2023/0064122 | A1* | 3/2023 | Hu | G06V 30/287 |
| 2023/0136527 | A1* | 5/2023 | Zhang | G06F 40/35 704/9 |

FOREIGN PATENT DOCUMENTS

CN          113095067 A   *   7/2021   ......... G06F 40/232

* cited by examiner

*Primary Examiner* — Tom Y Lu
(74) *Attorney, Agent, or Firm* — Keller Preece PLLC

(57) ABSTRACT

OCR-text correction system and method embodiments are described. The OCR-text correction embodiments comprise or cooperate with a transformer-based sequence-to-sequence language model. The model is pretrained to denoise corrupted text and is fine-tuned using OCR-correction-specific examples. Text obtained at least in part through OCR is applied to the fine-tuned pretrained transformer model to detect at least one error in a subset of the text. Responsive to detecting the at least one error, the fine-tuned pretrained transformer model outputs an updated subset of the text to correct the at least one error.

20 Claims, 9 Drawing Sheets

| Source | Prediction | Target |
|---|---|---|
| The money was given, and the conducteur departed with confident assurance that the game would be in the epicure's larder before the follow-ing morning. | The money was given, and the conducteur departed with confident assurance that the game would be in the epicure's larder before the follow- ing morning. | The money was given, and the conducteur departed with confident assurance that the game would be in the epicure's larder before the follow- ing morning. |

| Source | Prediction | Target |
|---|---|---|
| Two Closes of Rich oldSwarth LAND, adjoining each other, in the Ruffham Field | Two Closes of Rich old Swarth LAND, adjoining each other, in the Ruffham Field | Two Closes of Rich old Swarth LAND, adjoining each other, in the Ruffham Field |

| Source | Prediction | Target |
|---|---|---|
| We sailed from Kalamita Bay, ar.d soon we made the coast | We sailed from Kalamita Bay, and soon we made the coast | We sailed from Kalamita Bay, and soon we made the coast |

SYSTEMS AND METHODS FOR DETECTION AND CORRECTION OF OCR TEXT

CROSS-REFERENCE TO RELATED APPLICATION

The present application claims the benefit of U.S. Provisional Patent Application No. 63/237,839, filed on Aug. 27, 2021, which is hereby incorporated by reference in its entirety.

FIELD

The disclosed embodiments relate to detecting, correcting, modifying, or interpreting textual data, and more specifically to detecting and correcting errors in texts that have been obtained at least in part through optical character recognition ("OCR").

BACKGROUND

Many types of text, including historical document texts such as newspapers, capture daily life from a moment in history. Their contents may not ever be published in history books (and even if they were, so much of the information would necessarily be left out that valuable details would be lost), but they are rife with stories about everyday people, and connecting people to these stories empowers journeys of personal discovery. Connecting people to interesting and relevant articles within a text such as a newspaper is often challenging because many texts such as newspaper pages are stored as scanned images. Computer vision models have been developed to automatically separate pages into individual articles (via object recognition) and convert each article from image to text via optical character recognition (OCR). Still, because of the noise resulting from degradation of old documents and variation in typesetting, the resulting text often contains errors, which can cause problems for downstream applications of the data.

SUMMARY

Disclosure herein relates to example embodiments of a computer-implemented method. The method includes accessing a pretrained transformer model pretrained using a first training dataset, fine-tuning the pretrained transformer model using a second training dataset, providing text obtained at least in part through optical character recognition (OCR) to the transformer model, and applying the text to the fine-tuned pretrained transformer model to detect at least one error in a subset of the text; and outputting an updated subset of the text by the fine-tuned pretrained transformer model to correct the at least one error in the subset of the text.

In some embodiments, the transformer model is a bidirectional autoregressive transformer model. The bidirectional autoregressive transformer model includes a bidirectional encoder configured to receive the text, and an autoregressive decoder configured to detect the at least one error in the text and correct the at least one error in the text by predicting original text.

In some embodiments, the first training dataset includes one or more of token masking, token deletion, sentence permutation, document rotation, and text infilling.

In some embodiments, the second training dataset includes monograph and periodical example sentences.

In some embodiments, the transformer model is configured to perform the detection and correction of the at least one error in a single step.

In some embodiments, the transformer model is configured to correct the at least one error in the OCR text without being trained on alignment characters.

In some embodiments, the at least one error includes an oversegmentation error caused by incorrectly segmenting a single word into two separate words by OCR.

In some embodiments, the at least one error includes an undersegmentation error caused by incorrectly combining multiple words into a single word by OCR.

In some embodiments, the at least one error includes a misrecognized character error caused by incorrectly recognizing a character by OCR.

In some embodiments, the at least one error includes a missing character error caused by incorrectly omitting a character by OCR.

In some embodiments, the at least one error includes a hallucination error caused by incorrectly inserting a non-existing character by OCR.

BRIEF DESCRIPTION OF THE DRAWINGS

Figure (FIG.) 1 illustrates a diagram of a system environment of an example computing system, in accordance with some embodiments.

FIG. 7A is an example OCR-text correction to an oversegmentation error according to an embodiment.

FIG. 7B is an example OCR-text correction to an undersegmentation error according to an embodiment.

FIG. 7C is an example OCR-text correction to a misrecognized character error according to an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
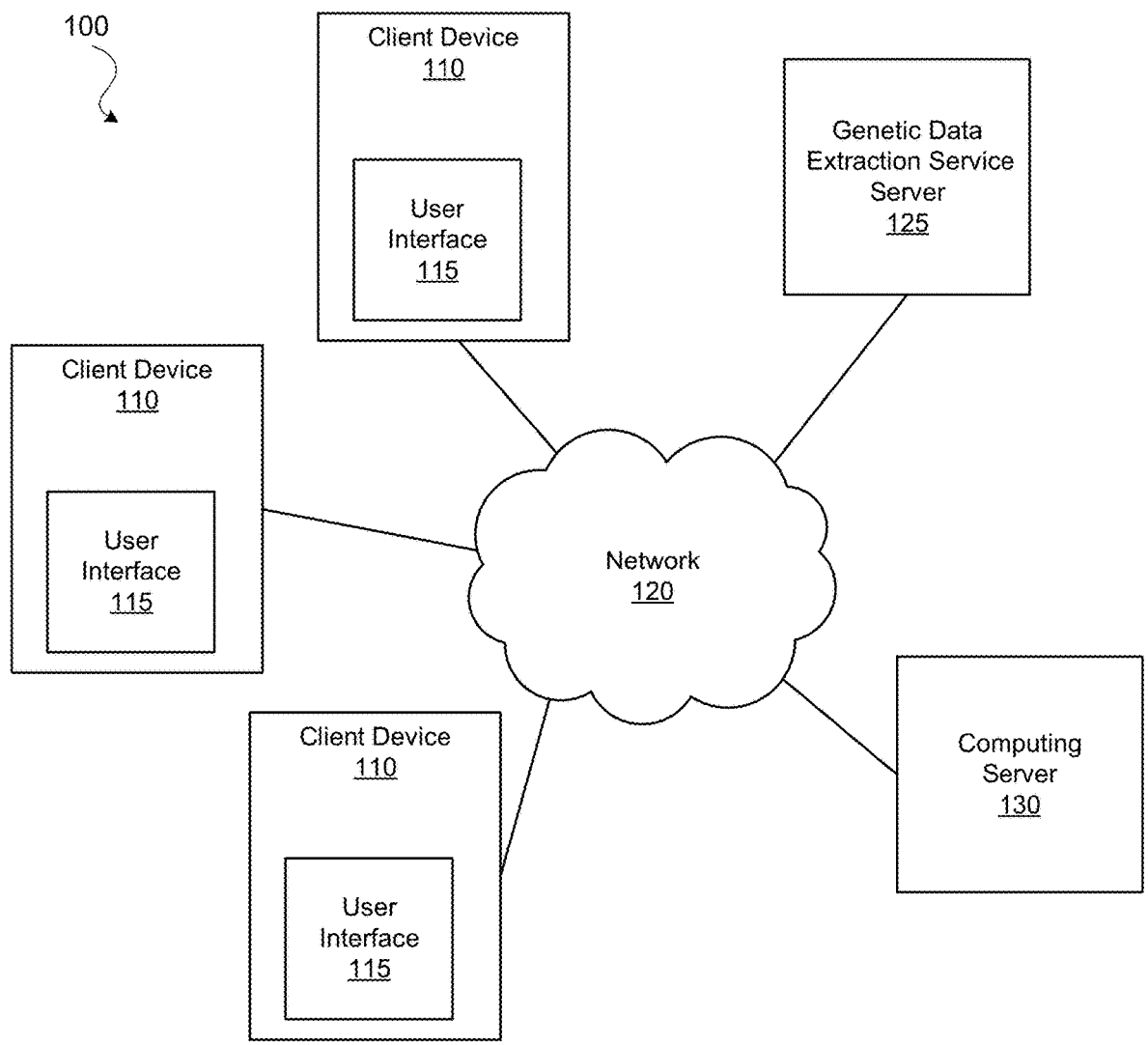

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more subnetworks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogy records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
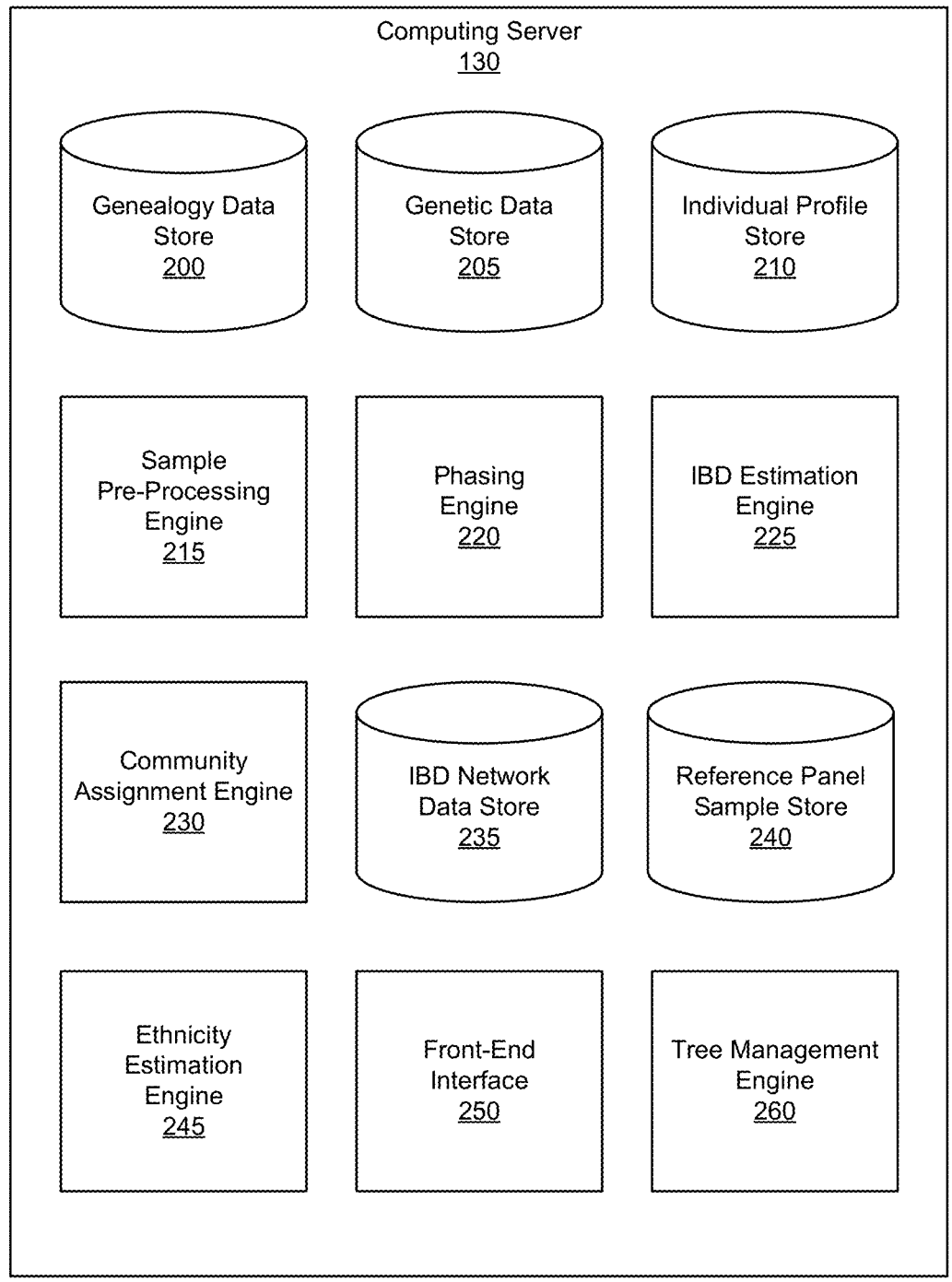
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, and a front-end interface 250. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogy records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. The human genome mutation rate is estimated to be $1.1*10^{-8}$ per site per generation. This may lead to a variant of approximately every 300 base pairs. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020, describes example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may also allow a user to search for various genealogy records, such as conducting an image facet search that is described in further detail below in associated with FIG. 3 through FIG. 7E. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and DNA test takers in the potential family trees through one or more machine learning models or other heuristic algorithms. For example, the tree management engine 260 may try putting the target individual in various possible locations in the family tree and determine the highest probability position(s) based on the genetic datasets of the target individual and other DNA test takers in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Patent Publication Application No., entitled "Linking Individual Datasets to a Database," US2021/0216556, published on Jul. 15, 2021, describes example embodiments of how an individual may be linked to existing family trees.

Example System for OCR-Text Correction

The field of natural language processing ("NLP") has undergone a rapid shift in the last several years due to the popularization of transformers as a new, powerful tool for language modeling. Many pretrained models like Bidirectional Encoder Representations from Transformers ("BERT") and generative pretrained transformers ("GPT") have advanced the state of the art on numerous NLP tasks, from text classification to question answering and translation. The key to the success of these models is their flexibility; pretraining on generic tasks like masked language modeling or next-sentence prediction gives models generalized language knowledge, allowing them to be easily adapted to more specific tasks.

However, despite the advances in OCR and related technology, OCR text (i.e. text that has been obtained using OCR) is often ridden with errors, such as misspelled characters ("substitutions"), spurious symbols ("insertions"), lost or missing text ("deletions"), combinations thereof such as a deletion followed by an insertion ("swap"), and otherwise. Other frequent types of errors include over-segmentation (e.g. splitting "indecent" into "in decent"), under-segmentation (e.g. combining "and just" into "andjust"), misrecognized character (e.g. presenting "into" as "ipto"), missing character (e.g. presenting "what" as "hat"), and/or hallucinations (e.g. where, from no corresponding text, something like %_a_q$). The commonality of errors in OCR text limits the downstream applicability of OCR text and necessitates the costly use of manual supervision, revision, and review.

OCR post-correction has been an important and unsolved problem since the inception of OCR technology, and traditional approaches have included n-gram or dictionary-based techniques. Other existing approaches to OCR error correction include the use of statistical and neural machine translation approaches, such as an ensemble of character-based statistical and neural machine translation ("NMT") models. Other approaches include BERT embeddings as input to train a CNN classifier followed by character-level sequence-to-sequence ("biLSTM") techniques for correction.

Additionally, there have been attempts to use BERT embeddings to train an error detection network and then apply character-level NMT for correction. BERT has also been used in the correction of errors from other sources, such as correcting errors generated by human typos. Pretrained BERT embeddings are used as input to a Bidirectional Gated Recurrent Unit ("biGRU") to detect errors, and then BERT is fine-tuned on a masked language modeling task to correct the sentence, where the errors detected in the first step are soft-masked. Other approaches involve BERT embeddings plus edit distance between the errors and candidate replacements to correct pre-identified errors.

While the above-described approaches suggest the potential for pretrained language models in text correction, existing approaches generally require additional infrastructure to handle text correction, which increases the cost and complexity of OCR text correction, including OCR error correction, in terms of computing power and resources, training time and complexity, and other complications. Another problem that existing approaches have not resolved is the problem of alignment of noisy and gold-standard texts in creating training data.

In view of the foregoing, there is a need for an improved system, computer-program product, and/or method for detection and/or post-correction of OCR text.

Although the embodiments of the disclosure are adapted for correcting OCR text, particularly from historical documents such as newspapers, it will be appreciated that the embodiments of the disclosure may be adapted, utilized, or combined so as to be applied to any suitable text or other input from any source, and may utilize any suitable model, a combination of models, or other technique, and any suitable training dataset.

For ease of understanding the disclosed embodiments of OCR-text correction systems, methods, computer-program products, and otherwise, certain modules and features are described independently. The modules and features may be synergistically combined in embodiments to provide an OCR-text correction system and method.

Figure 3:
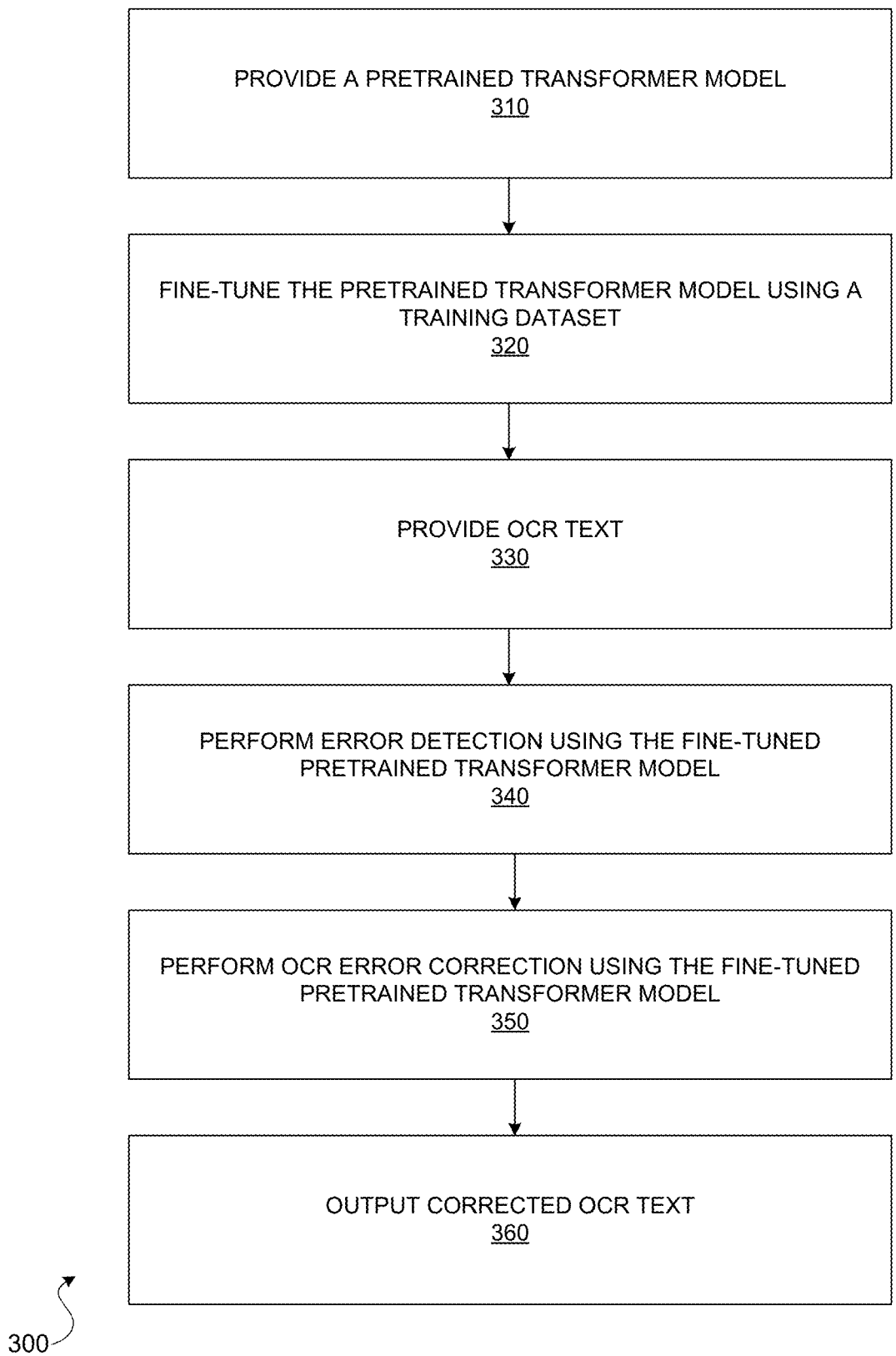
FIG. 3 is a flowchart depicting an example method for OCR-text correction according to an embodiment.

FIG. 3 is a flowchart depicting an example process 300 for OCR-text correction, in accordance with some embodiments. The process 300 may be performed by a computing device, such as the computing server 130. The process 300 may be embodied as a software algorithm that may be stored as computer instructions that are executable by one or more processors. The instructions, when executed by the processors, cause the processors to perform various steps in the process 300. One or more steps in the process 300 may be skipped, added, or changed in various embodiments. While the process 300 and related discussion in this disclosure are illustrated using genealogy records as examples, the process 300 and various embodiments described in this disclosure may also be used for other types of data records with images without the loss of generality. The categories, metadata, fields, and image types that are specific to genealogy records may be replaced with corresponding things in other types of data records in other embodiments.

The computing server 130 may access 310 a pretrained machine learning model such as a transformer model. In some embodiments, the pretrained transformer model is a sequence-to-sequence model, such as Bidirectional and Auto-Regressive Transformers ("BART"), pretrained on a first training dataset and configured to perform a non-OCR task, such as (but not limited to) one or a combination of token masking, token deletion, sentence permutation, document rotation, and text infilling operations. In some embodiments, the first training dataset comprises fewer than 1,000 documents. The machine learning model may be accessed from a public source or private source. For example, in some embodiments, the pretrained model may be available from as an open source model. In some embodiments, the model may be pretained by the computing server 130, such as using training samples that are specific to the computing server 130.

BART is a sequence-to-sequence language model pretrained on a variety of denoising tasks to acquire general knowledge about how language works from large amounts of training data. BART comprises a bidirectional encoder (in some respects similar to BERT plus an auto-regressive decoder, as in GPT). This allows BART to achieve new state-of-the-art results on several NLP benchmarks including dialogue response generation, question answering, and summarization, to name a few. While a transformer model is used as an example, the machine learning model may also take the form of any suitable model, such as a fully-connected, neural network, an autoencoder, a recurrent neural network (RNN), long short term memory (LSTM) model, etc.

BART differs from other popular pretrained language models in its training objective. Whereas most language models are trained on a masked token prediction or next token generation task, BART is trained to reconstruct text which has been corrupted or "noised" in a variety of ways. BART's pretraining objective can be seen as a generalization of masked language modeling. In addition to token masking, input may also undergo a combination of token deletion, text infilling, sentence permutation, and/or document rotation, combinations and/or alterations thereof, or other suitable operations.

The computing server 130 may also fine-tune 320 the pretrained transformer model. In some embodiments, fine-tuning may include providing a second training dataset and adjusting one or more parameters of the pretrained transformer model based on the training dataset. The training dataset may include task-specific examples, such as OCR-specific example sentences and/or documents that include OCR-specific errors.

In some embodiments, the computing server 130 bypasses the need to provide a training dataset that ensures alignment between input and output; that is, there is no need in such embodiments to provide gold-standard and example text that ensure alignment between characters, tokens, lines, etc., but rather may receive and training using examples that are not aligned.

The computing server 130 may also provide 330 OCR text. The text may be provided from historical documents, such as newspapers, or any other suitable source of text. In embodiments, an OCR module is provided to perform OCR directly upstream of the OCR-text correction components and methods, e.g. the pretrained transformer model.

The computing server 130 may then use the fine-tuned pretrained transformer model to perform 340 error detection and/or perform 350 error correction. The fine-tuned pretrained transfer model may then output 360 corrected OCR text. For example, in some embodiments, the computing server 130 applies the OCR text to the fine-tuned pretrained transformer model to detect at least one error in a subset of the OCR text. The fine-tuned pretrained transformer model may then predict an original subset of the OCR text, and output the predicted original subset of the OCR text as the corrected OCR text. For example, the fine-tuned pretrained transformer model may detect an oversegmentation error in a subset of OCR text, e.g., a word "follow ing", and output a predicted original subset of OCR text as "follow-ing" or "following." Additional examples of correcting various errors in OCR text are discussed with respect to FIGS. 7A-7E below.

In some embodiments, the process for correction of OCR text advantageously utilize BART, a sequence-to-sequence transformer model pretrained on text denoising, and fine-tune BART on a dataset. The embodiments advantageously handle error detection and correction in one step, and use full sentences rather than performing character-level translation. The OCR-text correction embodiments advantageously utilize BART for the first time in the task of OCR post-correction. It has been surprisingly found that the BART can be satisfactorily fine-tuned as a standalone text correction model.

By using a broader range of methods for corrupting input text, BART becomes more robust to noise. Adding noise to training data has been shown to improve model performance across many domains, even outside of NLP. In computer vision, for example, augmenting image data with color jitter or random erasing during training improves models for image classification and object detection. BART is not intended or trained for OCR tasks, but it has been surprisingly found that, with proper fine-tuning using task-specific examples, BART's pretraining and architecture are particularly advantageous for correcting errors in OCR-generated text.

That is, it has been surprisingly found that because of certain similarities between the types of text corruption seen during pretraining of BART and the corruption introduced by OCR, BART may be fine-tuned for OCR-specific error types with a relatively small set of examples even though BART is not pretrained for the specific types of errors that arise in OCR post-correction contexts; nor is BART intended for the specific context of OCR post-correction but rather is adapted for NLP in general. Additionally, it has been surprisingly found that the amount of data needed for fine-tuning BART to the needs of OCR post-correction is far smaller than the amount of data needed for pretraining BART.

Additionally, and advantageously, it has been surprisingly found that inputs to the encoder of BART need not be aligned with the decoder output, which allows for dealing with errors that result in a different number of tokens between the source and target texts, such as errors that frequently occur in OCR. Examples of these include over- or under-segmentation or hallucinated characters. Dealing with the alignment of noisy and gold-standard texts is a non-trivial issue in creating training data and in creating models for OCR correction. The OCR-text correction embodiments advantageously bypass the alignment problem that plagues the prior art and limits its effectiveness, feasibility, and robustness.

That is, whereas the standard dataset used for training OCR models has noisy data aligned character-by-character with the gold-standard texts, which leads to and necessitates tremendous effort to manually insert hallucinations into the training data, the embodiments may utilize examples of arbitrary length that need not match, which greatly simplifies the process of training, expands the size of available training data, and improves the results. Thus, the sequence-to-sequence BART-based model utilized (which is normally used for translation and summarization tasks rather than OCR) is configured to manage mismatches between lengths of inputs and outputs, a feature unrealized and unattained by existing approaches to OCR post-correction.

In an example embodiment, BART's pretraining corpus includes all of English Wikipedia plus the Book-Corpus, which represents a wide range of genres. To fine-tune BART for OCR post-correction, OCR-text correction embodiments utilize a dataset, such as the ICDAR 2017 post-OCR Correction Dataset. This dataset (which is exemplary and non-limiting) comprises historical newspaper and monograph texts ranging in data from 1744 to 1911. While the dataset comprises both English and French texts, BART was pretrained on English data only, and French texts were removed for fine-tuning. The remaining English-language data includes some 38,975 training sentences (comprising 27,414 monographs, 11,561 periodicals) and 7,759 evaluation sentences (comprising 3,966 monographs, 3,793 periodicals).

OCR-text correction embodiments of the disclosure utilize a suitable utility for fine-tuning BART, such as Python's Huggingface package. To prepare the data for input to the model, each text input, such as a newspaper article, is split into sentences and the special alignment characters are removed. Each sentence is tokenized with BART's tokenizer, which uses byte-level Byte-Pair-Encoding. The tokenized data is passed to BART one full sentence at a time.

Fine-tuning is initiated at the BART-base checkpoint (i.e. the published weights of the model arrived at after pretraining). In embodiments, training involves a batch size 6, AdamW optimizer, and cross-entropy loss between the model output and the target text to update weights. 3 epochs of training are performed on a suitable processing unit, such as a Tesla V100 SXM2 GPU with 16 GB RAM. While the above parameters are described, it will be appreciated that the disclosure is not limited thereto, and any other suitable parameters may be utilized. Fine-tuning may involve further training and adjusting the published weights arrived at after pretraining using a task-specific dataset comprising, in embodiments, a relatively small number—800 of documents having about 40,000 sentences—which were surprisingly found to result in state-of-the-art results using a novel approach to OCR post-correction. It is noted that the ICDAR dataset predates the inception of Hugging face and transformer models generally, such that no previous approach has attempted to fine-tune transformer models in this way and/or for OCR post-correction.

It has been surprisingly found that the model (e.g. a fine-tuned BART-based model) can handle a wide variety of error types, and improves the overall text accuracy by 29.4% on the evaluation set. Further, after fine-tuning, the BART-based model of OCR-text correction embodiments is able to recognize and correct all five types of errors (over-segmentation, under-segmentation, misrecognized character, missing character, hallucination).

As such, embodiments of OCR-Text Correction Systems and Methods address shortcomings in the art by providing an improved system and/or method for automatically receiving text and performing OCR or receiving OCR text, identifying errors in the OCR text, and correcting errors.

In contrast to existing OCR-text correction approaches, the embodiments advantageously facilitate accurate detection and correction of all types of OCR errors using training data that bypasses the alignment of noisy and gold-standard texts, reduces the cost and complexity of training any associated models, and utilizes a single Bidirectional and Auto-Regressive Transformer-based tool for OCR and OCR-text correction.

Example BART Architecture

Figure 4:
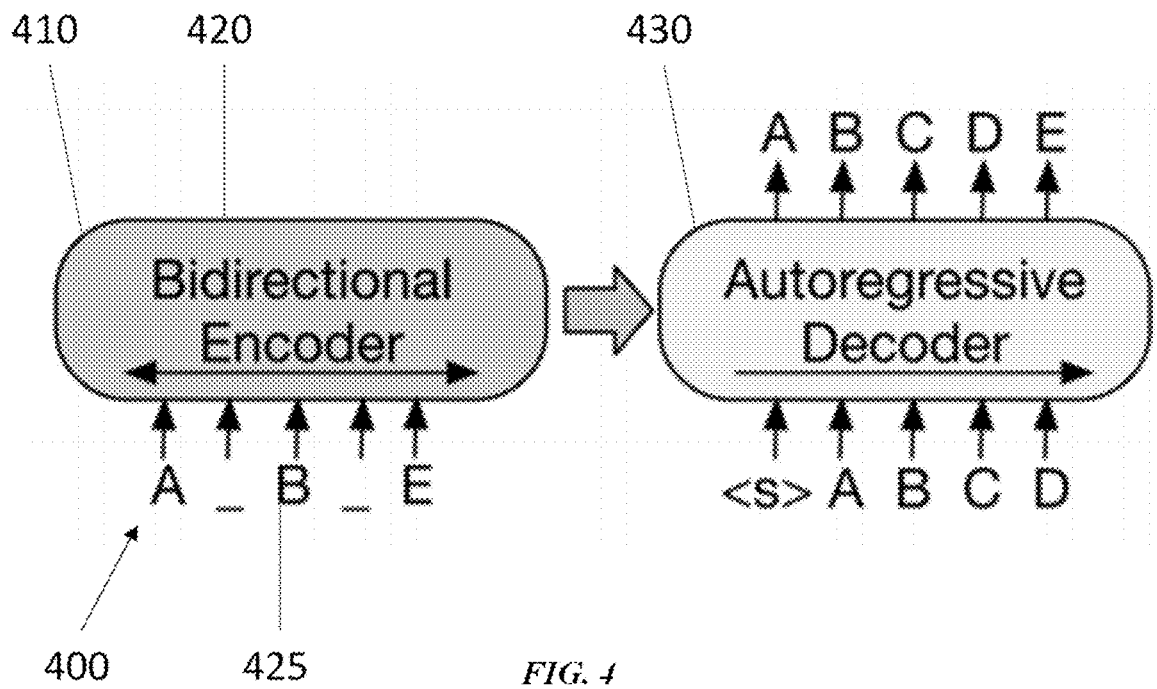
FIG. 4 is a diagram of a sequence-to-sequence transformer model architecture utilized in an embodiment of the disclosure.

Turning to FIG. 4, a diagram 400 showing BART architecture 410 is illustrated. The architecture 410 includes a bidirectional encoder 420 and an autoregressive decoder 430. The bidirectional encoder 420 may be similar to the bidirectional encoder provided in BERT, in which random tokens are replaced with masks, and the document is encoded bidirectionally. Missing tokens are predicted independently, so BERT cannot easily be used for generation. BART includes the autoregressive decoder 430, similar to GPT, where tokens are predicted autoregressively, but where words can only condition on leftward context so that the decoder cannot learn bidirectional interactions. Corrupted text 425 is input to the bidirectional encoder 420, and then the likelihood of the original text is calculated by the autoregressive decoder 430. The corrupted text 425 may have been corrupted by replacing spans of text with mask symbols.

Figure 5:
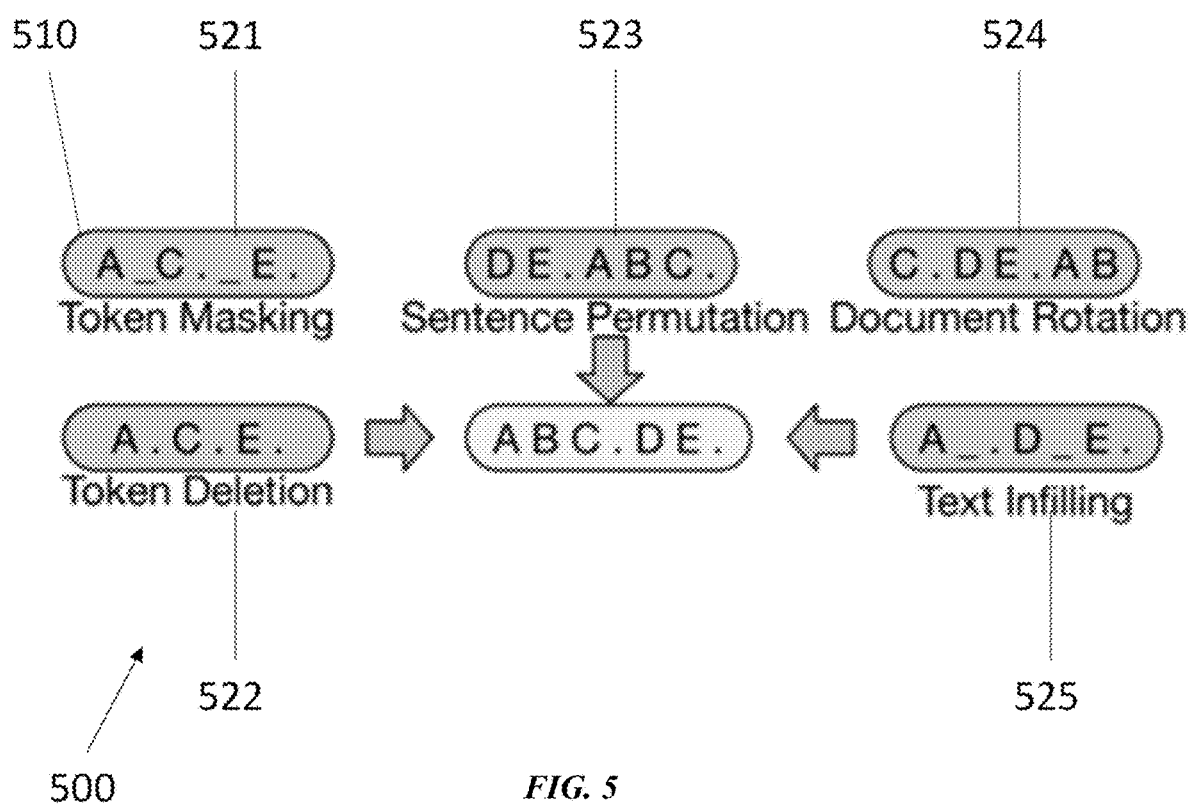
FIG. 5 is a diagram of a pretraining task for the sequence-to-sequence transformer model of FIG. 4.

FIG. 5 illustrates a plurality of text noising transformations 510 used in BART pretraining, including token masking 521, token deletion 522, sentence permutation 523, documentation rotation 524, and text infilling 525.

Figure 6:
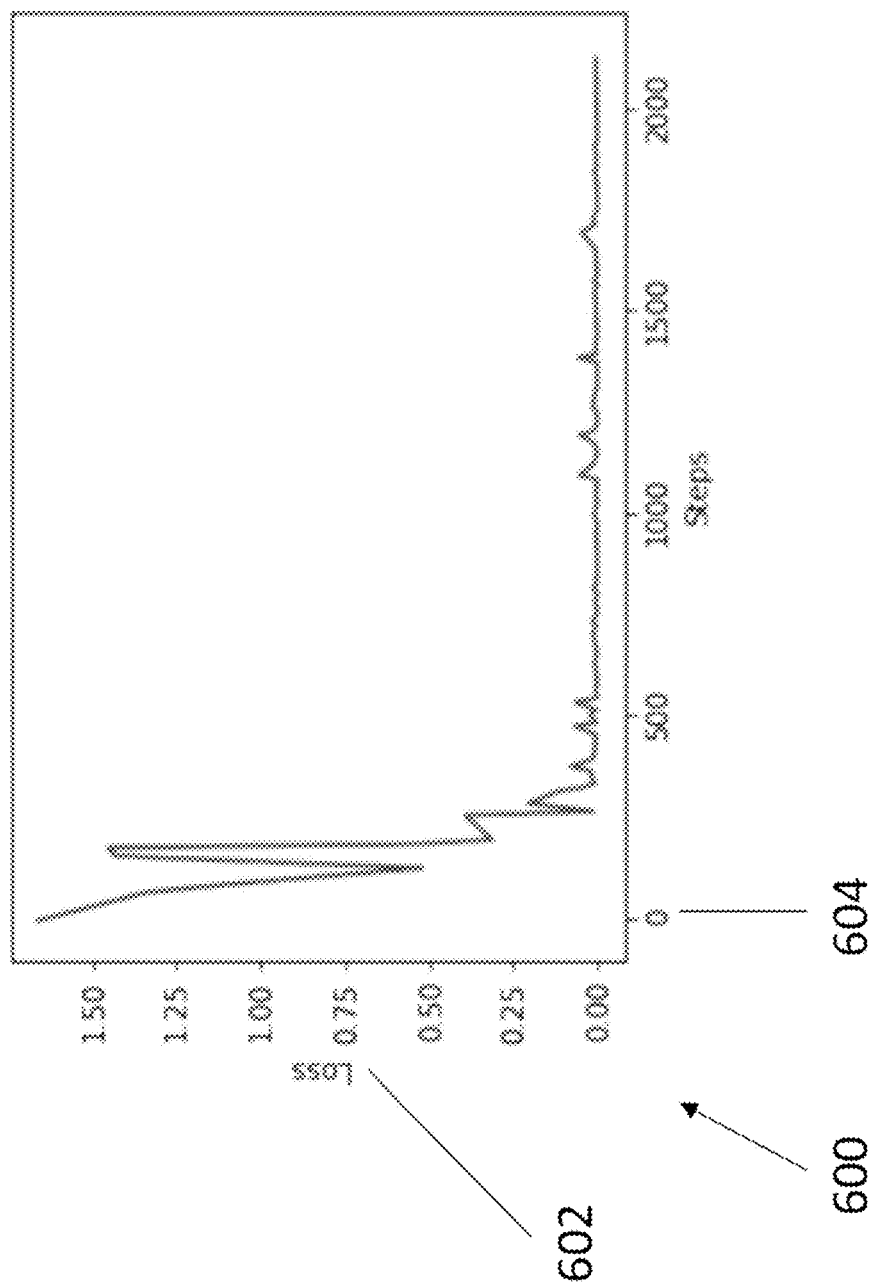
FIG. 6 is a graph of loss vs. steps when fine-tuning a sequence-to-sequence transformer model according to FIG. 4.

FIG. 6 illustrates a graph 600 showing the training loss 602 relative to steps 604. As seen, at approximately 275 steps, the loss declines to nearly zero. As the training loss 602 was surprisingly erratic, the batch size was increased to eight (i.e. loading eight sentences at a time instead of one sentence at a time before updating the weights of the model) in order to stabilize the training process while still remaining within the memory constraints of the GPU.

In some embodiments, the fine-tuning dataset can be augmented with custom OCR errors with emphasis on specific permutations of data to train the model to focus on and learn to correct specific errors (e.g. errors commonly observed in historical texts such as newspapers) and/or to increase the noise generally for increased robustness. One such specific permutation may be injecting special character-specific OCR errors. Another such permutation may be deleting spaces in the example sentences to improve the performance of the model on undersegmentation errors.

FIG. 7A illustrates an example 700A of a correction to an oversegmentation error. An oversegmentation error is an error in which a single word is incorrectly segmented into two separate words by human (such as typos) and/or machine (such as OCR operations). The embodiments correct the oversegmentation error 704A—resulting in "following" being transcribed as "follow ing"—by adding a hyphen to the initial word fragment in the prediction 706A, rather than deleting the space and writing as a single word. This is done because such errors are typically due to words being broken across lines to fit within the margins of a page. As seen, the prediction 706A properly comports with the target 708A.

FIG. 7B illustrates an example 700B of a correction to an undersegmentation error 704B. An undersegmentation error is an error in which two separate words are incorrectly combined into a single word by a human (such as typos) and/or a machine (such as OCR operations). As illustrated in FIG. 7B, the words "old Swarth" is incorrectly represented as "oldSwarth." As seen, the prediction 706B properly comports with the target 708B in that the prediction 706B separates "old" and "Swarth." The embodiments advantageously facilitate such corrections despite the relative uncommonness of such errors in the training dataset and despite the fact that deleting spaces is not one of the noising strategies used in BART's pretraining.

FIG. 7C illustrates an example 700C of a correction to a misrecognized character error 704C. A misrecognized character error is an error in which a character is incorrectly represented as another character by a human (such as typos) and/or a machine (such as OCR operations). As illustrated in FIG. 7C, the word "and" is incorrectly represented as "ar.d." As seen, the prediction 706C properly comports with the target 708C in that the prediction 706C properly identifies a, n, and d to spell "and." The embodiments advantageously accomplish this though the proper name Kalamita Bay is in error, which is a common issue in OCR due to the difficulty of predicting proper names which have idiosyncratic spellings.

Figure 7D:
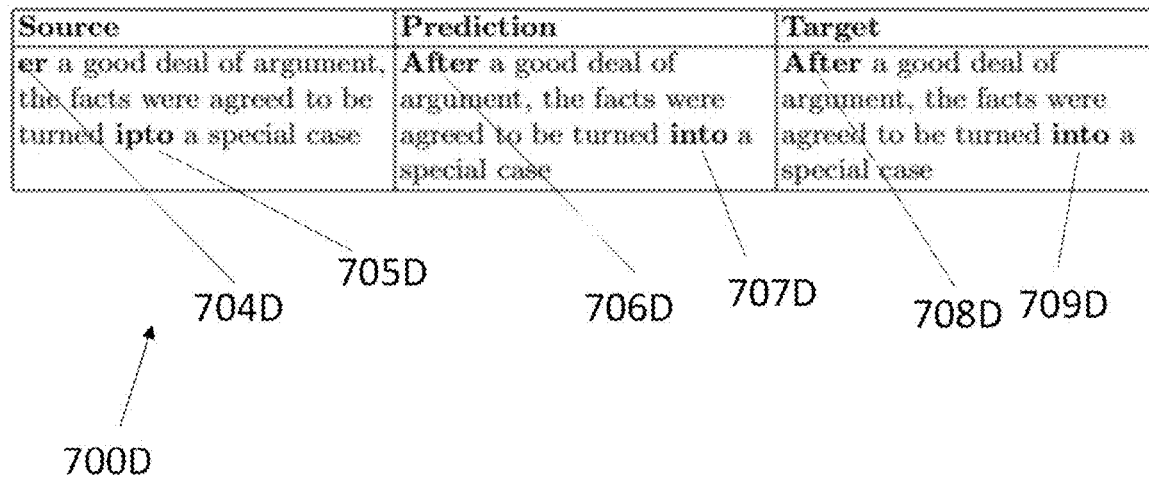
FIG. 7D is an example OCR-text correction to a missing character error according to an embodiment.

FIG. 7D illustrates an example 700D of a correction to a missing character error 704D. A missing character error is an error in which a character is incorrectly omitted in text by a human (such as typos) and/or a machine (such as OCR operations). As illustrated in FIG. 7D, the word "After" is incorrectly represented as "er." As seen, the prediction 706D properly comports with the target 708D in that the prediction 706D properly identifies "After" despite only having "er" in the received OCR text. Note also that the example 700D correctly addresses a misrecognized character error 705D, in which "into" is represented as "ipto." The prediction 707D properly comports with the target 709D in that the prediction 707D properly identifies "into" as the corrected spelling. This demonstrates the ability of embodiments to automatically correct an arbitrary number of errors without additional input information about the number or location of errors.

Figure 7E:
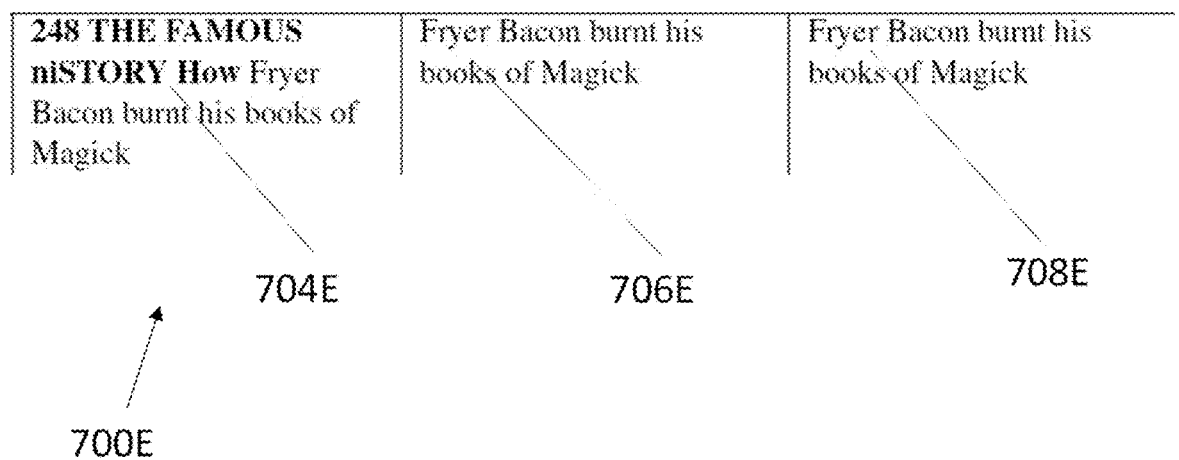
FIG. 7E is an example OCR-text correction to a hallucination error according to an embodiment.

FIG. 7E illustrates an example 700E of a correction to a hallucination error 704E. A hallucination error is an error in which a character is incorrectly inserted into text by human (such as typos) and/or machine (such as OCR operations). As illustrated in FIG. 7E, the phrase "Fryer Bacon burnt his books of Magick" is incorrectly represented as "248 THE FAMOUS niSTORY How Fryer Bacon burnt his books of Magick." As seen, the prediction 706E properly comports with the target 708E in that the prediction 706E properly removes "248 THE FAMOUS niSTORY How" and leaves the properly transcribed portion "Fryer Bacon burnt his books of Magick."

Performance on OCR post-correction is standardly measured by percent improvement, as calculated according to Equation 1 below:

$$\% \text{ improvement} = \frac{dist(s, t) - dist(p, t)}{len(t)} \quad \text{Eq. 1}$$

In Eq. 1, dist( ) is the Levenshtein distance between two strings, s is the noisy source text, p is the predicted text from the model, and t is the target text.

Embodiments of the present disclosure achieve 29.4% improvement in text accuracy on the evaluation set, with 32.2% improvement on monographs and 23.1% improvement on periodicals. The disparity in performance between monographs and periodicals can be seen in other existing approaches, and is thought to be due to the imbalance in the training data and/or to a greater difficulty generally of the periodical genre.

Table 1 below illustrates the performance of embodiments with previous approaches. Notably, the OCR-text correction embodiments advantageously achieve state-of-the-art performance while also having a simpler operation, as no alignment information is needed to train the models, and detection and corrections are performed in a single step. Note also that BART w/o fine-tuning is markedly ill-suited to the task of OCR post-correction. That is, off-the-shelf BART with no fine-tuning does poorly at correcting errors, with a 7.6% decrease in character accuracy. By contrast, with fine-tuning as described herein, a 29.4% improvement in text accuracy on the evaluation set is achieved.

TABLE 1

| Approach | Monograph | Periodical | Overall |
| --- | --- | --- | --- |
| Char-SMT/NMT | 43 | 37 | 40 |
| CLAM | 29 | 22 | 26 |
| EFP | 13 | 0 | 7 |
| MMDT | 20 | 0 | 10 |
| WFST-PostOCR | 28 | 0 | 14 |
| Coustaty et al, 2018 | 30 | 10 | 20 |
| Nguyen et al, 2020 | 36 | 27 | 27 |
| BART w/o fine-tuning | −7 | −9 | −8 |
| Present Disclosure | 32 | 23 | 29 |

In embodiments, fine-tuning can be performed on different types of noisy data such as text from handwriting recognition models and human-generated typos. Additional data augmentation strategies may be utilized as suitable. Multilingual models such as mBART may be used for non-English language data.

In yet further embodiments, discriminative loss techniques may be used to determine whether a model can differentiate between a gold-standard sentence and a machine-generated sentence; to the extent that the model can differentiate, a signal is sent back to the model to improve its weights until the sentences output are indistinguishable from real sentences.

Computing Machine Architecture

Figure 8:
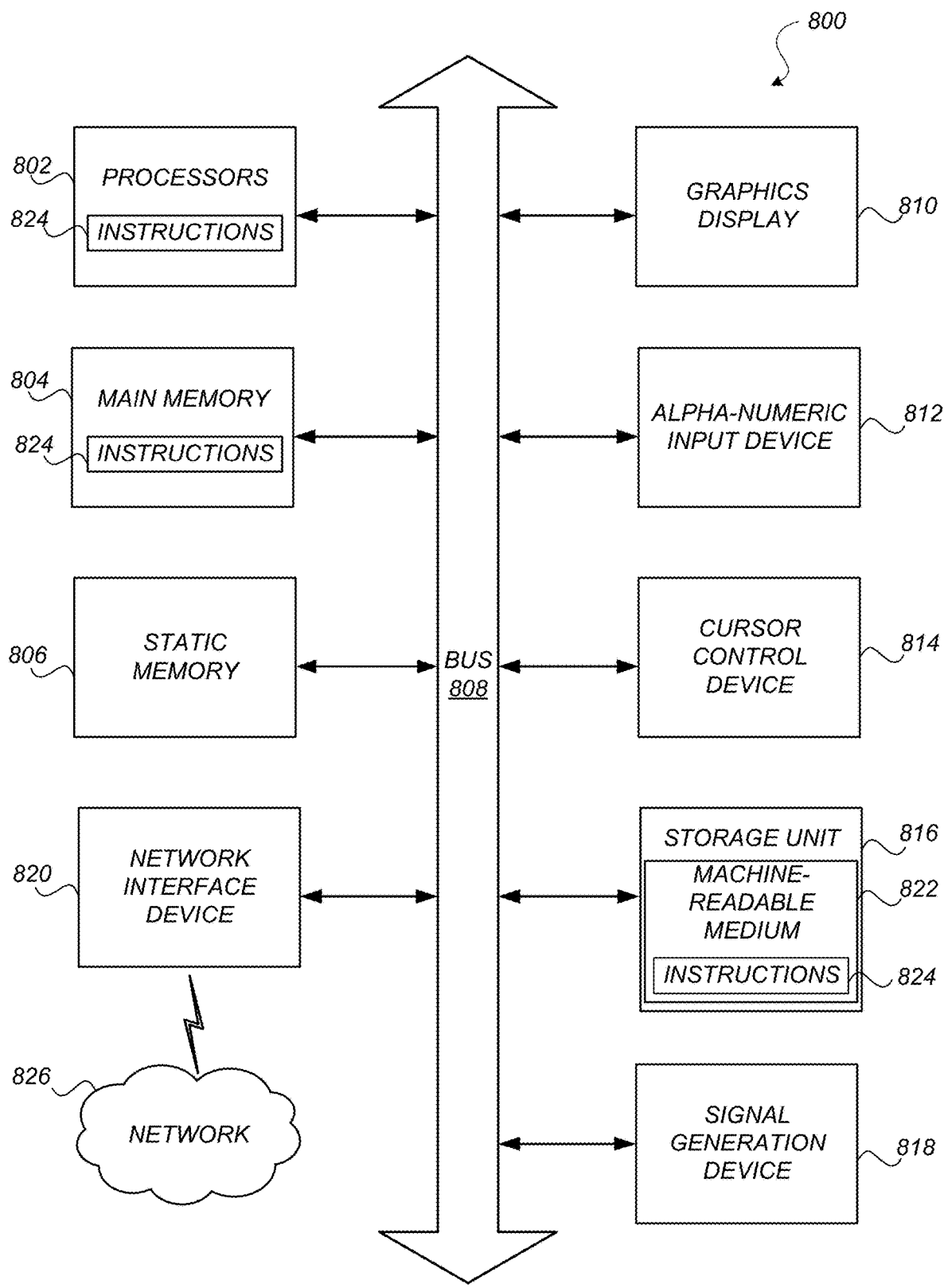
FIG. 8 is a block diagram of an example computing device, in accordance with some embodiments.

FIG. 8 is a block diagram illustrating components of an example computing machine that is capable of reading instructions from a computer-readable medium and executing them in a processor (or controller). A computer described herein may include a single computing machine shown in FIG. 8, a virtual machine, a distributed computing system that includes multiple nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to, the client device 110, the computing server 130, and various engines, interfaces, terminals, and machines shown in FIG. 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" and "computer" may also be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 800 may also include a memory 804 that store computer code including instructions 824 that may cause the processors 802 to perform certain actions when the instructions are executed, directly or indirectly by the processors 802. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 802 and reduces the space required for the memory 804. For example, the database processing techniques and machine learning methods described herein reduce the complexity of the computation of the processors 802 by applying one or more novel techniques that simplify the steps in training, reaching convergence, and generating results of the processors 802. The algorithms described herein also reduces the size of the models and datasets to reduce the storage space requirement for memory 804.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 800 may include a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The graphics display unit 810, controlled by the processors 802, displays a graphical user interface (GUI) to display one or more results and data generated by the processes described herein. The computer system 800 may also include an alphanumeric input device 812 (e.g., a keyboard), a cursor control device 814 (e.g., a mouse, a trackball, a joystick, a motion sensor, or other pointing instruments), a storage unit 816 (a hard drive, a solid-state drive, a hybrid drive, a memory disk, etc.), a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the processors (e.g., processors 802) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, and (6) U.S. Patent Publication Application No., entitled "Linking Individual Datasets to a Database," US2021/0216556, published on Jul. 15, 2021.

What is claimed is:

1. A computer-implemented method, comprising:
    receiving a document that includes text obtained at least in part through OCR;
    applying an adjusted bidirectional-and-auto-regressive-transformers (BART) model to the text to detect at least one error in a subset of the text, the adjusted BART model having been adjusted from a BART model pretrained to perform a non-optical character recognition (non-OCR) task using a first training dataset comprising corrupted text data and the adjusted BART model further being adjusted from the BART model to perform an OCR task using a second training dataset comprising OCR samples; and
    generating, by applying the adjusted BART model to the text of the document, an updated subset of the text correcting the at least one error in the subset of the text.

2. The computer-implemented method of claim 1, wherein the BART model comprises:
    a bidirectional encoder configured to receive the text; and
    an autoregressive decoder configured to detect the at least one error in the text and correct the at least one error in the text by predicting original text.

3. The computer-implemented method of claim 1, wherein the first training dataset includes one or more of the following: token masking, token deletion, sentence permutation, document rotation, or text infilling.

4. The computer-implemented method of any of claim 1, wherein the second training dataset includes monograph and periodical example sentences.

5. The computer-implemented method of claim 1, wherein the adjusted BART model is configured to perform detection and correction of the at least one error in a single step.

6. The computer-implemented method of claim 1, wherein the adjusted BART model is configured to correct the at least one error in the text without being trained on alignment of characters between inputs to an encoder and outputs to a decoder.

7. The computer-implemented method of claim 1, wherein the first training dataset comprises fewer than 1,000 documents.

8. The computer-implemented method of claim 1, wherein the adjusted BART model has been fine-tuned from a BART-base checkpoint comprising weights arrived at based on pretraining.

9. The computer-implemented method of claim 1, wherein the at least one error includes an undersegmentation error caused by incorrectly combining a plurality of words into a single word by OCR or an oversegmentation error caused by incorrectly segmenting a single word into two separate words by OCR.

10. The computer-implemented method of claim 1, wherein the adjusted BART model has been fine-tuned utilizing a hugging face package.

11. The computer-implemented method of claim 1, wherein the at least one error includes a missing character error caused by incorrectly omitting a character by OCR or a misrecognized character error caused by incorrectly recognizing a character by OCR.

12. The computer-implemented method of claim 1, wherein the at least one error includes a hallucination error caused by incorrectly inserting a non-existing character by OCR.

13. A computer system for detecting and/or correcting text, comprising:
    a processor; and
    memory in communication with the processor, the memory configured to store instructions that, when executed by the processor, cause the processor to:
        access an adjusted bidirectional-and-auto-regressive-transformers (BART) model, the adjusted BART model having been adjusted from a BART model pretrained to perform a non-optical character recognition (non-OCR) task using a first training dataset comprising corrupted text data and the adjusted BART model further being adjusted from the BART model to perform an OCR task using a second training dataset comprising OCR samples;

provide text obtained at least in part through optical character recognition (OCR);

apply the text to the adjusted BART model to detect at least one error in a subset of the text; and generate an updated subset of the text by the adjusted BART model correcting the at least one error in the subset of the text.

14. The computer system of claim 13, wherein the BART model comprises:

a bidirectional encoder configured to receive the text; and an autoregressive decoder configured to detect the at least one error in the text and correct the at least one error in the text by predicting original text.

15. The computer system of claim 13 wherein the first training dataset includes one or more of the following: token masking, token deletion, sentence permutation, document rotation, or text infilling.

16. The computer system of claim 13, wherein the second training dataset includes monograph and periodical example sentences.

17. The computer system of claim 13, wherein the adjusted BART model is configured to perform detection and correction of the at least one error in a single step.

18. The computer system of claim 13, wherein the adjusted BART model is configured to correct the at least one error in the text without being trained on alignment of characters between inputs to an encoder and outputs to a decoder.

19. The computer system of claim 13, wherein the first training dataset comprises fewer than 1,000 documents.

20. A non-transitory computer readable storage medium configured to store code comprising instructions, wherein the instructions, when executed by a processor, cause the processor to:

access an adjusted bidirectional-and-auto-regressive-transformers (BART) model, the adjusted BART model having been adjusted from a BART model pretrained to perform a non-optical character recognition (non-OCR) task using a first training dataset comprising corrupted text data and the adjusted BART model further being adjusted from the BART model to perform an OCR task using a second training dataset comprising OCR samples;

provide text obtained at least in part through optical character recognition (OCR);

apply the text to the adjusted BART model to detect at least one error in a subset of the text; and generate an updated subset of the text by the adjusted BART model correcting the at least one error in the subset of the text.

\* \* \* \* \*